United States Patent Office 2,986,928
Patented June 6, 1961

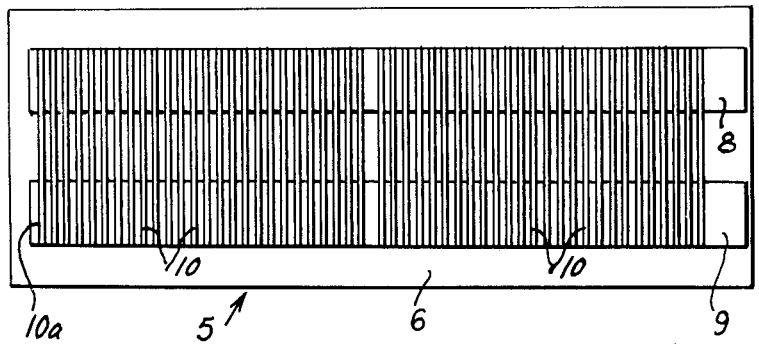
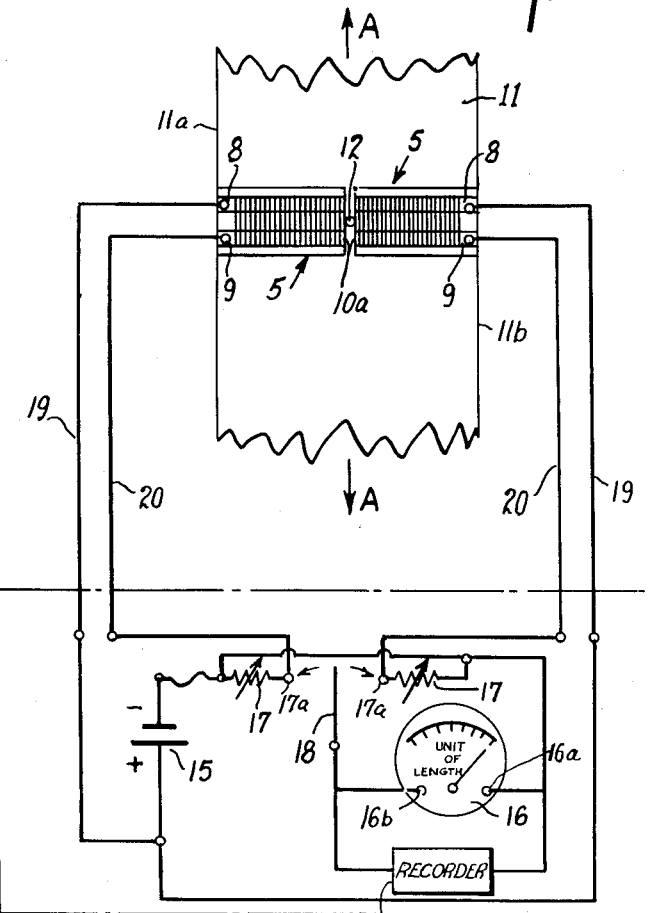

2,986,928
APPARATUS FOR THE MEASUREMENT OF CRACK PROPAGATION IN TEST PANELS AND THE LIKE
Brian Douglas Winter White, Montreal, Quebec, Canada, assignor to Canadair Limited, Montreal, Quebec, Canada
Filed July 16, 1959, Ser. No. 827,625
4 Claims. (Cl. 73—88.5)

This invention relates to apparatus for the measurement of crack propagation in test panels and like structures.

The invention consists essentially in applying to test panels or other like structures a transducer comprising a series of resistive elements which are laid along the expected line of travel of a developing crack. wherein the developing crack will cause the resistive elements to fracture as the crack develops and passing an electric current through the transducer and through suitable recording instruments whereby the open circuiting of the resistive elements on rupturing will record on the recording instrument a direct reading as a lineal measurement of the progress of rupturing of the resistive elements and of the extension of the crack in the test panel.

The transducer is in the form of base strip of insulating material to which is applied a pair of busbars in the form of a thin film of relatively high conductivity paint, the busbars being spaced apart from each other. Superimposed on the busbars and connecting them together electrically are a series of resistive strips in the form of thin films of relatively low conductivity paint, the latter resistive strips adhering to the portion of the base strip between the busbars. The transducer can be formed in long strips and cut to length as required. In practice the transducer strips are bonded to the test panels by means of a bonding material which has, when dried, approximately the same elasticity characteristics as the test panel or other structure to which it is to be applied, so that when a crack is developed in the test panel the crack will also develop in the bonding material and the insulating base strip which, in turn, will cause instant fracture of the resistive strips in succession as the crack develops.

This technique enables the crack length to be continuously plotted against time and since multi-pen and multi-galvanometer recorders are readily available, one or more records of crack measurement may be plotted whilst, simultaneously, the electrical output from a load-cell in the stress machine in use for the test can be recorded, thus enabling correlation between crack length and load on the test panel to be readily obtained.

Alternatively, if the electrical outputs from the crack propagation transducer and the load cell are fed respectively to the X and Y inputs of an X—Y plotter, a direct plot of crack length versus load can be obtained.

Usually in test panels a knowledge of where a crack will commence and the approximate direction of the crack propagation is available. Crack lengths of from one or two inches up to about three feet require examination for test purposes and often a fairly large number of similar test panels require to be tested necessitating that a simple, direct and inexpensive method be employed.

A primary object of the invention is to provide a simple, reliable and inexpensive apparatus for the detection of the initiation of cracks in test panels and other like structures and the measurement of the propagation of such panels.

A further object of the invention is to provide a transducer for crack detection and measurement which can be printed on paper or other suitable insulating material.

A further object of the invention is to provide a transducer for crack detection from which can be recorded immediately, the commencement of a crack followed by an indication of lineal measurement of the crack propagation.

These and other objects of the invention will be apparent from the following detailed description of the invention and the accompanying drawings, in which:

FIGURE 1 is a plan view of one form of the transducer for use in detecting and measuring the propagation of cracks in test panels and other structures.

FIGURE 2 is an electrical line diagram showing the transducers applied to a test panel and the electrical current supply to the transducers and the instrumentation whereby the crack initiation is detected and a lineal measurement of the crack development is recorded.

Referring to the drawings, the transducer 5 is formed on a base strip 6 and can be formed in strips of a predetermined length or can be formed in a long continuous rolled strip which can then be cut up into desired length as required.

The transducer 5 is preferably formed by printing, preferably by the silk screen method, or, any other method of applying the elements of the transducer on to the base sheet 6 could be used equally well. The transducer 5 is composed of a pair of busbars 8 and 9 laid lengthwise on the surface of the base strip 6 and spaced apart from each other in parallel relationship. The busbars 8 and 9 are formed from thin layers of a good conducting material and a paint containing a heavy silver content such that the resistance per 1" length of busbar lies between one and a tenth ohms has proved satisfactory.

A series of resistance bars 10 are laid transversely across the busbars 8 and 9. These resistance bars 10 can also be applied by the silk screen method and are formed from a resistive paint, each bar having a resistance similar to all the others of between 10,000 ohms and 100,000 ohms. When these resistance bars 10 are deposited transversely on the busbars 8 and 9 they also adhere to that portion of the base strip 6 between the busbars to form a gridwork.

As an example of the proportions of a suitable transducer for use in crack detection, the insulating strip 6 of paper or other suitable material could be say 3" wide, the busbars 8 and 9 could be ½" wide spaced ½" apart and disposed lengthwise of the base strip 6 in spaced parallel relationship to each other. The resistance bars 10 laid across the busbars 8 and 9 would be one twentieth of an inch wide separated from each other by one twentieth inch gaps.

The application of the transducers 5 to a test panel is shown in FIGURE 2 of the drawings. In order to obtain a reliable indication of the initiation of the crack and its propagation it is necessary that a satisfactory bond be made between the insulated base strip 6 and the test panel 11. This will only occur if a bonding cement is used which will have an elasticity (after hardening) similar to that of the material of the specimen to be tested. For this reason a cement with brittleness characteristics which are controllable is desirable in order to obtain the best results. A cellulose-acetate cement containing a plasticising agent, is suitable for this purpose. This is a somewhat more severe problem than that met with in strain measurements. However, a bonding agent such as Baldwin's S.R. 4. Strain gauge cement is generally satisfactory.

As an example of the application of the transducers to a panel for testing purposes the test panel 11 is say ten inches wide, and has a one thirty-secondth inch diameter weakening hole 12 drilled centrally between the side edges 11a of the panel.

With the pull of the loading machine being in the direction of the arrows A it is expected that the cracks in the test panel will develop from the weakening hole 12 in a plane perpendicular to the arrows A. The transducers 5 are located on the test panels so that the busbars 8 and 9 will lie on each side of the expected line of crack propagation and that the resistive bars 10 will bridge the expected line of crack propagation. Two transducers or detecting strips 5 five inches long are cut and bonded transversely across the test panel 11 with the inner end resistive strips 10a of each transducer just touching the adjacent edge of the weakening hole 12. After the bonding cement between the transducers and the test panel has set, the test panel 11 is placed in a suitable loading machine.

Due to the thinness of both the base strip 6 and the painted resistive bars 10, any fracture of the test surface underlying the transducer will cause a fracture of the strip 6 and resistive bars.

A crack detecting and measuring instrumentation 14 consists of a battery 15, a milliammeter 16 and a recorder 21 connected in parallel with the milliammeter 16, two variable resistances 17 and a three position switch 18. The leads 19 from the positive side of the battery 15 are connected to the outer ends of the busbars 8 and the return leads 20 from the outer ends of the busbars 9 are connected through the variable resistances 17 with the negative side of the battery 15 and with the terminal 16a of the milliammeter 16 and to one side of the recorder 21. The other terminal 16b of the milliammeter 16 is connected to the opposite side of the recorder 21 and across the terminals 17a of the variable resistances 17 through the three position switch 18. The switch 18 enables either transducer 5 to be connected in circuit and the appropriate variable resistance enables a full scale deflection to be set on the scale of the milliammeter 16 in each case at the start of the test. By calibrating the milliammeter in reverse a direct reading of crack length is available in increments a one-tenth of an inch which is the distance from the edge of one resistive strip to the edge of the next resistive strip. As the load is applied to the test panel 11 and when cracks are initiated in the panel the first resistive strips 10a are ruptured and open circuited, this results in a corresponding reduction in the current which can be immediately observed on the milliammeter 16 and recorded on the recorder 21 as a permanent record. As successive resistive strips 10 are ruptured and open-circuited, further reductions in current occur and a direct reading of the propagation of the cracks can be observed on the milliammeter and recorded on the recorder 21.

For some test purposes it may be more advantageous to paint the transducers directly on to the test panel or structure in which case the surface of the test panel or structure would first be coated with an insulating paint or lacquer, with the transducers painted directly onto the surface of the insulating paint or lacquer after the latter has dried. In this case it is necessary that the insulating paint or lacquer have similar elastic characteristics to those required of the bonding cement used in bonding the base strip 6 to the test panel.

In addition to the visual reading of the results of the test on the milliammeter 16 the output or return leads 20 can be connected to automatic recording devices of well known types. Such devices may be oscillographs which employ galvanometers and photo-sensitive paper, preferably of the direct writing type or pen recorders or X—Y plotters.

The simple form of transducer above described for use in the detection of cracks in test panels and other structures ensures that an adequate stock can be kept on hand and cut off to the size required in length of from one or two inches up to three feet or more, and the method of using the transducers in tests ensures a positive and accurate recording of both the initiation of the cracks and step by step propagation of the cracks as they develop and effect rupturing of the resistive bars one after the other.

What I claim is:

1. A transducer for the detection of the initiation and propagation of cracks in test panels and other like structures comprising a base strip of insulating material, a pair of current conducting strips bonded on said base strip, said current conducting strips being spaced apart and parallel with each other, a series of rupturable resistive strips extending between and electrically connected to said current conducting strips at predetermined intervals along the length of the current conducting strips and bonded to said base strip, means to pass a current through said transducer and means to record the rupture of said resistive strips as a function of lineal measurement of a developing crack in said panel.

2. A transducer for the detection of the initiation and propagation of cracks in test panels and other like structures comprising, a base strip of insulating material, a pair of current conducting strips on said base strip, a series of rupturable resistive strips extending between and electrically connected to said current conducting strips at predetermined intervals along the length at the current conducting strips, a bonding agent bonding said base strip to said panel to be tested, said bonding agent having elasticity characteristics similar to that of the panel being tested, means to pass a current through said transducer, and means to record the rupture of said resistive strips as a function of lineal measurement of a developing crack in said panel.

3. A transducer for the detection of the initiation and propagation of cracks in test panels and other like structures comprising a base strip of insulating material, a pair of current conducting strips comprising thin films of high conductive material bonded on said base strip, said current conducting strips being spaced apart and parallel with each other, a series of rupturable resistive strips comprising thin films of low conductive material extending between and electrically connected to said current conducting strips at predetermined intervals along the length of the current conducting strips and bonded to said strips, means to pass a current through said transducer and means to record the rupture of said resistive strips as a function of lineal measurement of a developing crack in said panel.

4. A transducer for the detection of the initiation and propagation of cracks in test panels and other like structures comprising a base strip of insulating material having a low resistance to fracture, a pair of current conducting strips comprising thin films of high conductive material bonded on said base strip, said current conducting strips being spaced apart and parallel with each other, a series of rupturable resistive strips comprising thin films of low conductive material extending between and electrically connected to said current conducting strips at predetermined intervals along the length of the current conducting strips and bonded to said strips, means to pass a current through said transducer and means to record the rupture of said resistive strips as a function of lineal measurement of a developing crack in said panel.

References Cited in the file of this patent

UNITED STATES PATENTS

| | | |
|---|---|---|
| 2,759,078 | Brown | Aug. 14, 1956 |
| 2,812,657 | Straub | Nov. 12, 1957 |